(No Model.) 2 Sheets—Sheet 1.
J. R. LITTLE.
MANUFACTURE OF METAL WHEELS.
No. 488,440. Patented Dec. 20, 1892.
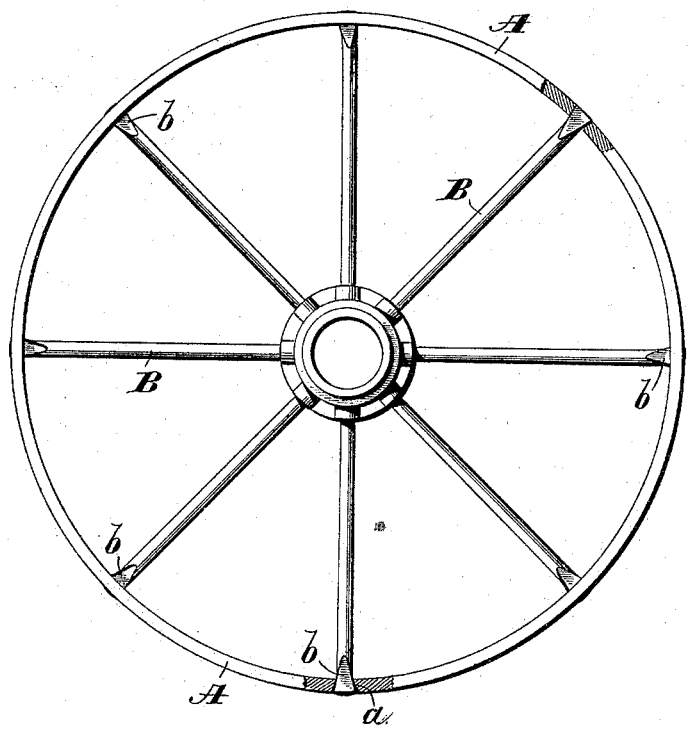
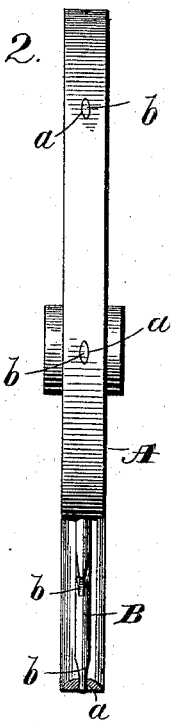
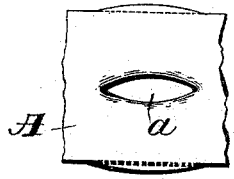
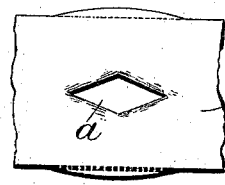
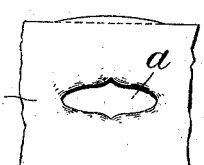
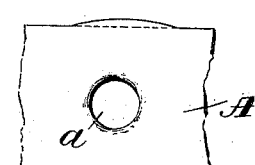
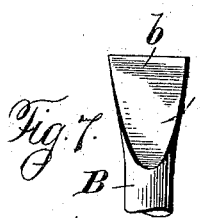
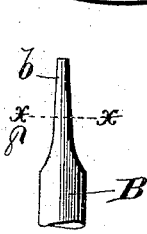
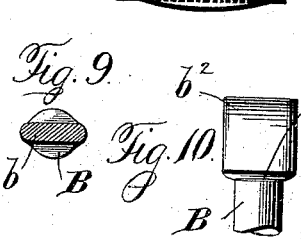
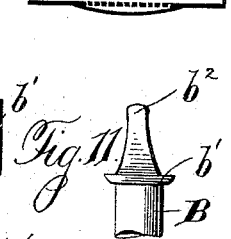
Witnesses:
Jas. E. Hutchinson.
Henry C. Hazard.
Inventor
James R. Little
by Pringle & Pringle
his Attorneys
THE NORRIS PETERS CO., PHOTO-LITHO., WASHINGTON, D. C.

(No Model.) 2 Sheets—Sheet 2.
J. R. LITTLE.
MANUFACTURE OF METAL WHEELS.
No. 488,440. Patented Dec. 20, 1892.
Fig. 12
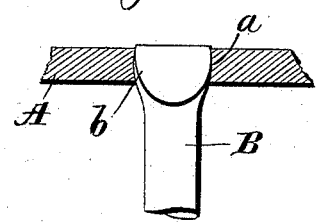
Fig. 13.
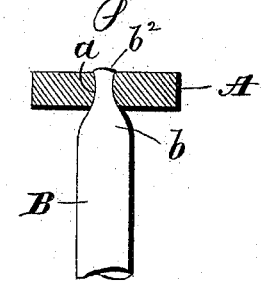
Fig. 14.
Fig. 15. Fig. 16.
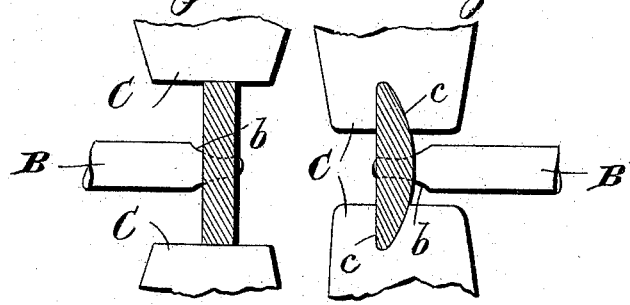
Witnesses:
Jas. E. Hutchinson.
Henry C. Hazard.
Inventor:
James R. Little
by Kindle and Russell
his Attorney

UNITED STATES PATENT OFFICE.

JAMES R. LITTLE, OF QUINCY, ILLINOIS.

MANUFACTURE OF METAL WHEELS.

SPECIFICATION forming part of Letters Patent No. 488,440, dated December 20, 1892.

Application filed April 12, 1892. Serial No. 428,803. (No model.)

*To all whom it may concern*

Be it known that I, JAMES R. LITTLE, a citizen of the United States, residing at Quincy, in the county of Adams, and in the State of Illinois, have invented certain new and useful Improvements in the Manufacture of Metal Wheels; and I do hereby declare that the following is a full, clear, and exact description thereof, reference being had to the accompanying drawings, in which—

Figure 1, shows a side view of a wheel, with the spokes fastened to the rim, in accordance with my invention, portions of the rim being removed to show some of the inclosed spoke ends;—Fig. 2, an edge view of the same showing the wheel partly in elevation and partly in section;—Fig. 3, a detail view on an enlarged scale showing the rim as provided with one form of opening for receiving the tenon on the spoke end;—Figs. 4, 5 and 6, similar views showing other forms of such openings;—Fig. 7, a detail view on an enlarged scale showing in elevation the form of tenon on the spoke end, which I prefer to use with the form of rim opening shown in Fig. 3;—Fig. 8, a similar view looking at the spoke end, from a different direction;—Fig. 9, a view of a section on line x, x, of Fig. 8;—Figs. 10 and 11, views like those shown in Figs. 7 and 8, respectively, showing a different form of spoke end and tenon;—Fig. 12, a detail view showing two other forms of rim entering part of a spoke;—Fig. 13, a view showing, on an enlarged scale, a longitudinal section of a portion of the rim with the spoke tenon fastened therein;—Fig. 14, a cross section of the same with the spoke end also in section;—Fig. 15, a detail view on an enlarged scale showing the manner of compressing the wheel rim by a plain die applied to its opposite sides, and Fig. 16, a similar view showing the rim compressing die provided with cavities to receive and inclose parts of the opposite sides of the rim during the compressing operation.

Letters of like name and kind refer to like parts in each of the figures.

The object of my invention, has been to provide, as an improvement in the art of making metal wheels, a new and improved process of securing the ends of the spokes to the rim, and to this end my invention consists in the process, as hereinafter specified.

In carrying out my invention, I take the wheel rim A, whether welded or unwelded, and make therein a series of openings a, a, to receive the outer ends of the spokes B, B, which can be made into tenons of any desired shape to fit said openings. The latter are made in such way, that the metal of the rim will be split and spread, instead of being cut or punched out. For this purpose I prefer to use round nosed punches, which, penetrating the rim, will simply separate and spread the metal, without removing any of the same. In the drawings I show several forms of such openings, that appearing in Fig. 3, being in the shape of an elliptical slot, whose longer diameter runs longitudinally with reference to the rim A. This I make with a punch in the form of a flat round-nosed chisel, which splits and shoves the metal out away from the point where the opening is being made, but cuts none of it away.

While the elliptical form of tenon receiving opening is a good and desirable one, I do not intend to limit myself thereto, as any other form, such, for instance, as those shown in Figs. 4, 5 and 6, can be made use of instead. In making all of these, the desired spreading, as distinguished from a cutting or punching away of the rim metal, can be secured by the use of properly shaped round nosed punches or chisels. This spreading of the metal can be a side-wise one toward the sides of the rim, or can be made to extend in all directions, by giving the punch or chisel different shapes, that is, by forming it with inclined spreading surfaces only on two opposite sides, or making it taper on all sides down toward its point.

The narrow elliptical opening, such as is shown in Fig. 3, is made by a spreading of the rim mainly toward the sides of the latter, which, with a narrow rim, will bulge out portions of the metal beyond the rim edges, as indicated, the rim being thus widened at the point.

The other openings shown in Figs. 4, 5 and 6, can be formed by a spreading of the metal of the rim, not only sidewise, but, longitudinally, the extent of the longitudinal upsetting or spreading depending, of course, upon the inclination of the surfaces of the punch or chisel which face in the direction of the length of the rim.

The making of the spoke end or tenon receiving openings, as set forth above, can be done with the portions of the rim being operated upon, either heated or cold, without departure from my invention.

The outer ends or portions of the spokes B, B, which are to be inserted in the openings $a$, $a$, are, preferably, formed into tenons $b$, $b$, having a shape, in cross section, corresponding substantially with that of the openings which they are to engage.

In Figs. 7 to 11, inclusive, I show tenons adapted for use with the form of openings shown in Fig. 3, being elliptical in cross section. Those shown in Figs. 10 and 11, have shoulders $b'$, $b'$, at their bases, which can be formed on the spokes before or after the tenons are secured into the rim in the manner to be set forth.

If it should be desired to have more metal in a tenon, than would be secured by a simple flattening out or shaping of the end of the rod forming the spoke, I contemplate upsetting such end, so as to make it thicker, at the time of or before the formation of the tenon. The outer end of the latter can be made a little thicker than that part immediately joining, so as to form a head $b^2$, as shown in Figs. 11 and 14, but I do not consider such head necessary, as, during the securing of the tenon in the rim, in accordance with my invention, I have found that the tenon will be acted upon, so that its portion next to its outer end and inclosed within the rim opening will necessarily be a little less thick than such end.

Where the spoke tenon and receiving rim mortise or opening therefor are round, either one or both of them can be threaded, and, whether round or not, either one or both of them may be corrugated or provided with projecting portions.

Having made the openings or mortises in the rim by spreading the metal thereof, as described and shown, and having made the ends of the spokes of the proper form, I insert the latter into the former and compress the spread metal of the rim upon them, by suitable dies, or other means, as desired. I contemplate heating the rim, or the portions of it containing the spoke tenon receiving mortises, before the compression has been performed, in order that, after the latter, the rim will, in cooling, be shrunk upon the spoke tenons, but I do not intend to limit myself to such heating before or in connection with the compression, as the spoke tenons can be inclosed and fastened firmly in place by compressing or forcing back the spread portions of the rim, while cold.

Where the spreading of the rim metal, in making the openings, is mainly a sidewise one, toward the edges of the rim, the requisite compression can be secured by a plane faced die C, or compressing device, applied to the sides of the rim, as indicated in Fig. 15, or by a die whose opposing parts have cavities $c$, $c$, to inclose portions of the rim, so as to preserve the shape of its edges, when it is compressed as indicated in Fig. 16. While I have shown these two forms of die, I do not limit myself thereto, but contemplate using, instead, any desired shape or construction of compressing device, adapted to force inward toward the spoke tenon the metal which has been spread in any direction by the tool used in forming the tenon receiving opening or mortise. Thus, where the metal has been spread longitudinally, as well as sidewise, with reference to the rim, I can use clamping and compressing means adapted to force and move the spread metal on all sides inward toward and upon the spoke tenon, so that the latter will be most firmly secured within its mortise. The result of the compression, to force the spread metal back toward its original position, is not only a most close and firm clasping of the spoke tenon, but, especially where the rim is cold, a compressing of the spoke tenon, so that its outer end will be somewhat thicker than the portion next adjoining. The shape thus given the tenon will cause an interlocking of tenon and mortise, a desirable end which is aimed at and may be also secured by the corrugating, threading, or roughening of the tenon, or mortise, or both, as hereinbefore suggested.

Where the rim or the parts thereof in which are the mortises, or spoke tenon receiving openings, are heated for the compressing operation, I contemplate securing the heating by an electrical or other heating appliance, of any suitable form and construction.

The spokes can be secured to the rim in accordance with my process, either one at a time or all together, and either before, after or at the time that their inner ends are secured to the hub.

While I prefer to make the spoke receiving openings or mortises in the rim by a splitting and spreading of the rim metal, without the preliminary punching or removing of any of the latter, I contemplate, also, first making small openings, with a punch or other tool to admit the spreader, and then with the latter of any suitable shape, securing the outward spreading of the metal, which forms an essential feature of the process covered by the present application.

I do not claim, or intend to cover by the claims herein, a process in the carrying out of which, the spoke receiving openings or mortises are simply punched or cut out without the hereinbefore described spreading of the rim metal, as such a process is claimed in my other pending application for United States patent, Serial No. 428,804.

Having thus described my invention, what I claim is—

1. As an improvement in the art of making metal wheels, the process of attaching the spoke ends to the part to which they are to be secured, which consists in making openings in such part, so as to spread the material thereof, inserting the spokes in such openings, and forcing back the spread material, to compress it upon the inclosed portions of the spokes, substantially as and for the purpose specified.

2. As an improvement in the art of making metal wheels, the process of attaching the spoke ends to the part to which they are to be secured, which consists in making spoke receiving openings in such part, so as to spread the metal thereof, inserting portions of the spokes into the openings, heating the spread metal, and forcing it back, while hot, to compress it upon the inclosed portions of the spokes, substantially as and for the purpose described.

3. As an improvement in the art of making metal wheels, the process of attaching the spoke ends to the parts to which they are to be secured, which consists in preparing spoke receiving openings in said part, by spreading the metal thereof, forming tenons and shoulders on the spokes, inserting such tenons in the openings therefor, with the shoulders abutting against the part containing the latter, and forcing back the spread metal, to cause it to inclose the spoke tenons, substantially as and for the purpose described.

In testimony that I claim the foregoing I have hereunto set my hand this 24th day of February, A. D. 1892.

JAMES R. LITTLE.

Witnesses:
   THEODORE B. POPE,
   S. DEIDESHEIMER.